United States Patent
Warner et al.

[11] Patent Number: 5,897,431
[45] Date of Patent: Apr. 27, 1999

[54] HONING TOOL AND METHOD OF MAKING

[75] Inventors: Rueben Brown Warner, Westlake; Joseph P. Gaser, Euclid, both of Ohio

[73] Assignee: Jason Incorporated, Cleveland, Ohio

[21] Appl. No.: 08/850,210

[22] Filed: May 2, 1997

Related U.S. Application Data

[60] Division of application No. 08/585,403, Jan. 11, 1996, which is a continuation-in-part of application No. 08/090,770, Jul. 13, 1993, application No. 08/209,436, Mar. 10, 1994, Pat. No. 5,556,328, and application No. 08/052,366, Apr. 23, 1993, Pat. No. 5,527,213.

[51] Int. Cl.$^6$ .............................. B23F 21/03; B23F 21/23
[52] U.S. Cl. ............................................. 451/540; 428/370
[58] Field of Search .................................. 451/463, 466, 451/468, 469, 470, 481, 462, 540; 428/370, 372, 373, 374, 364; 51/298, 299

[56] References Cited

U.S. PATENT DOCUMENTS

| | | | |
|---|---|---|---|
| 5,155,945 | 10/1992 | Tyler et al. | 451/463 |
| 5,187,904 | 2/1993 | Tyler et al. | 51/330 |
| 5,216,847 | 6/1993 | Scheider et al. | 451/463 |
| 5,318,603 | 6/1994 | Scheider et al. | 451/463 |
| 5,329,730 | 7/1994 | Scheider et al. | 451/466 |
| 5,331,775 | 7/1994 | Carmichael et al. | 451/51 |
| 5,352,025 | 10/1994 | Huang | 300/21 |
| 5,378,051 | 1/1995 | Kirkkala et al. | 300/21 |
| 5,527,213 | 6/1996 | Tyler et al. | 451/466 |
| 5,538,328 | 7/1996 | Lewis, Jr. | 300/21 |
| 5,556,328 | 9/1996 | Scheider et al. | 451/463 |

*Primary Examiner*—Timothy V. Eley
*Assistant Examiner*—Derris Holt Banks
*Attorney, Agent, or Firm*—Renner, Otto, Boisselle, Sklar

[57] ABSTRACT

Honing tools and methods of making such tools utilize a compact bundle of abrasive containing plastic monofilaments projection a relatively short distance from a holder with the compacted tips forming the working face of the tool. The bundle may be secured to the holder by a thin layer of adhesive or by a clinched or swaged girdling lip or rim on the holder which embraces the bundle. In addition, the bundle is further infused with an elastomer, preferably foamed. The bundle is enclosed in a mold which may be part of the clinching process and an elastomer is injected into the mold to infuse and encapsulate the bundle. The encapsulation fills the interstices of the bundle and form an integument around the bundle in effect making the tip action tool into a solid yet elastic block. This enables the abrasive monofilaments to have a higher abrasive loading since they are additionally supported by the matrix, and the tool to be applied at higher pressures. The matrix may be injected through the working face, the bottom of the holder or through mechanical anchor holes in the sides of the holder.

16 Claims, 2 Drawing Sheets

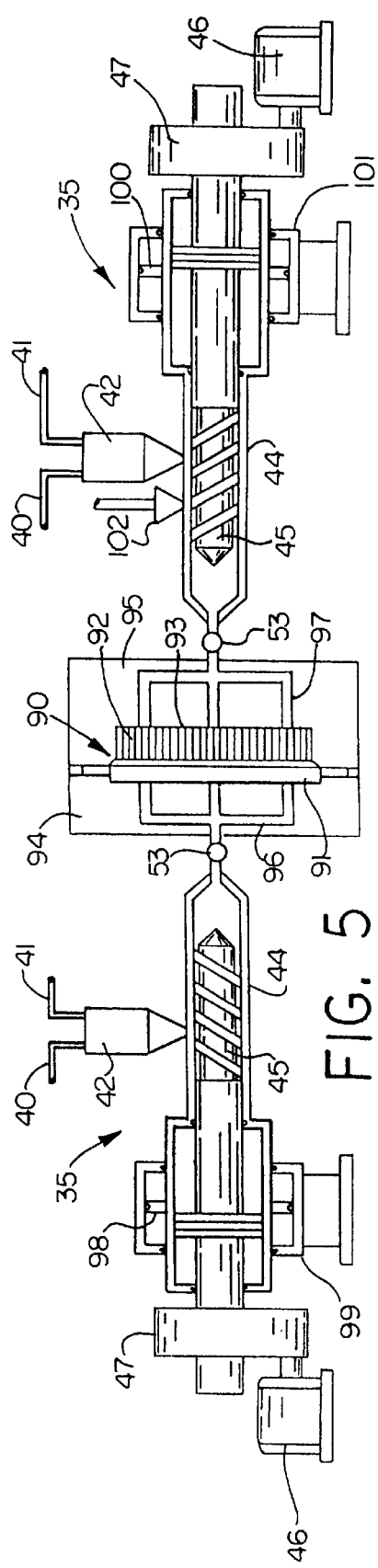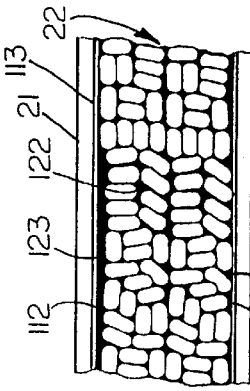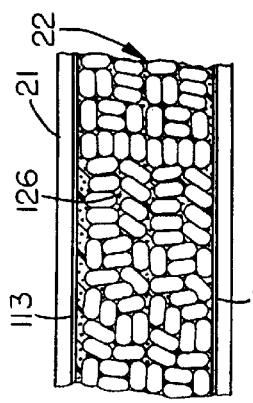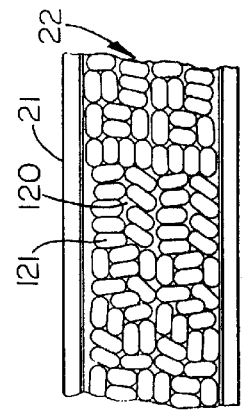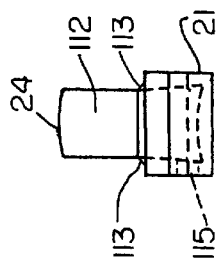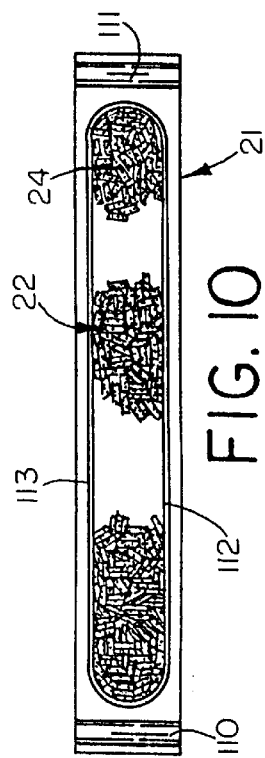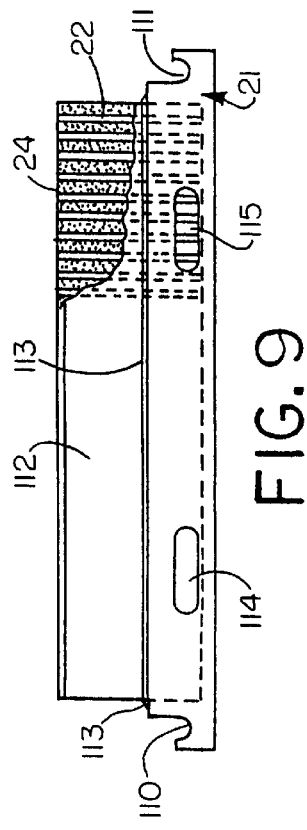

HONING TOOL AND METHOD OF MAKING

RELATED APPLICATIONS

This is a division of copending application Ser. No. 08/585,403, filed Jan. 11, 1996, which is a continuation-in-part of copending application of R. Brown Warner and Joseph P. Gaser, Ser. No. 08/090,770 filed Jul. 13, 1993, entitled "Honing Tool And Method Of Making". Such application is incorporated herein by reference. This application is also a continuation-in-part of application of Alfred F. Scheider and R. Brown Warner, Ser. No. 209,436 filed Mar. 10, 1994, now U.S. Pat. No. 5,556,328, entitled "Abrasive Filament Honing Tool And Method Of Making And Using The Same". Such application is incorporated herein by reference. This application is also a continuation-in-part of application of James B. Tyler, R. Brown Warner and Joseph P. Gaser, Ser. No. 08/052,366 filed Apr. 23, 1993, now U.S. Pat. No. 5,527,213, entitled "Honing Tool And Method Of Making". Such application is incorporated herein by reference.

DISCLOSURE

This invention relates generally as indicated to a honing tool, and more particularly to an improved yet low cost honing tool, and method of making the tool.

BACKGROUND OF THE INVENTION

Honing is used to correct hole geometry and also to prepare surfaces that require a specific finish or scratch pattern. Typical of the latter are piston bores or liners in internal combustion engines. On such oil lubricated moving part surfaces, it is customary to provide what is known as a plateau finish. A plateau finish is similar to a conventional finish, except that the peaks have been removed or flattened out. The finish attempts to duplicate the finish after the engine has been broken in, and removes or smooths out metal that would otherwise be removed by piston rings. A proper plateau finish contributes to the mechanical and environmental efficiency of the engine. This is usually accomplished by a two stage honing process including rough and finish honing.

Conventional honing tools are usually conventional stones or plated super abrasive tools. Most stones use vitrified, metal or resins bonds, and are similar to hard grinding wheels. Plated honing tools normally make use of super abrasives and consist usually of a single layer of abrasive attached to a metal surface by electrolytic plating. Inspection of the surfaces after use of these tools sometimes finds abrasive grains embedded in the metal surface, even though the honing operation is done under constant flushing with a lubricant or coolant. Abrasive contact with piston rings or other moving parts leads to premature wear, blow-by, or mechanical inefficiency, as well as environmental problems.

More recently, there has been developed a unique honing tool useful as a secondary or tertiary step honing tool which produces a superior honing finish in high production situations. An example of this type of tool is shown in Scheider et al., U.S. Pat. No. 5,216,847, issued Jun. 8, 1993. A process for using the tool shown in such patent is disclosed in U.S. Pat. No. 5,331,775.

There is also disclosed in the copending application of Tyler et al., Ser. No. 08/052,366 filed Apr. 23, 1993, entitled "Honing Tool And Method Of Making", a somewhat similar disposable honing tool for honing operations less exacting than high production operations, such as engine rebuilding.

The tools described in the above patents or copending application comprise a bundle of tightly packed parallel monofilaments of relatively short extent, which bundle is secured in a holder. The holder is in turn mounted in the honing machine head and driven for rotation, usually the axis of the bore, and for axial reciprocation within the bore. The tightly packed tips of the monofilaments of the projecting bundle form the working face of the tool. The material of the monofilaments is nylon or other suitable fairly rigid and tough plastic, having the abrasive mineral or grain homogeneously entrained therein throughout. The monofilament may have as much as about 30 to about 45% by weight of abrasive material. The compacted tips provide a working face which has sufficient flexibility or softness to avoid planting abrasive in the work surface, and yet which is aggressive enough to form the proper surface and plateau finish. The laterally compacted finger-like elements compliment each other to obtain stiffness and yet provide a degree of compliance to the tool. The compliance allows the tool to travel the surface and condition it even though it may have indentations and waviness.

While the abrasive monofilaments are tightly packed and such filaments are mutually self supporting, those filaments around the exterior of the bundle can flex to a limited extent away from the tip working face of the bundle. This peripheral flexing of the monofilaments of the compacted bundle is not normally a problem unless high tool pressures are used or the filaments have a high abrasive loading or content. The tough plastic material provides the tensile and modular strength to the extruded monofilaments and at high abrasive loading such as above 30–45%, such loading tends to weaken the monofilament. Such high abrasive loading with the peripheral flexing may cause premature failure and excessive wear of the filament. This problem in effect limits the amount of abrasive in the filaments.

While the yielding compacted tip surface is important to the proper functioning of the tool, particularly in secondary or tertiary operations, the amount of abrasive delivered to the work surface is a measure of the aggressiveness of the tool and its efficiency (work vs. time). It would, accordingly, be desirable to have a tool having all of the advantages of the yielding compacted tip surface, and yet with the ability to deliver more abrasive to the work surface per unit of time, and at a higher tool pressure.

In the copending application Ser. No. 08/052,366, there is disclosed a low cost crimp method of making honing tools where a relatively narrow bundle of monofilaments is inserted in a rectangular metal holder with a thin deformable lip or rim which is swaged to grip the bundle in the forming process. No adhesive or other form of attachment to the holder is employed. While the process and tool provides a low cost disposable alternative to the larger and more costly precision made tools such as shown in copending application Ser. No. 209,436, the size of the bundle is limited, and if one filament breaks or becomes loose, other filaments may become loose limiting the useful life of the tool. When the bundle is clinched in the process, the filaments tend to flare to some extent, both above and below the rim. The clinching forms a natural dovetail matching that of the bundle assisting in holding the bundle in place. Such tools also suffer from the same abrasive loading problems identified above. It would, accordingly, be useful if a solution to the abrasive loading problem would also enable the lower cost crimp tools to be made in larger sizes without fear of excessive filament breakage or filaments becoming loose or dislodged, while at the same time delivering more abrasive to the work surface per unit of time at a higher application. It would also be useful to be able to make the larger more precise compacted tip filament tools with less precision in formation and attachment of the bundle to the holder while nonetheless improving the performance of the tool.

SUMMARY OF THE INVENTION

A honing tool comprises a metal holder and a compacted bundle of plastic abrasive containing monofilaments projecting a short distance from the holder with the compacted tips forming the working face of the tool. The abrasive monofilaments may be circular or rectangular in cross section. The entire bundle is infused with and encapsulated in a matrix of an elastomer. The matrix preferably extends within and without the holder. Within the holder, the matrix acts as an adhesive as well as forming a solid block which can be in the form of a dovetail, while the holder is in the form of a dovetail groove. The elastomer may be injected into the holder through the bottom or lateral walls, or through the working face. The lateral walls may have holes which fill with the matrix, such matrix projections within such holes then acting as mechanical keys to secure additionally the bundle to the holder.

The projecting portion of the bundle is preferably enclosed in a mold during injection so that the bundle to the tip work face is infused and encapsulated by the elastomer. The elastomer then not only fills the interstices of the bundle, but also forms a thin integument laterally surrounding the bundle. The integument is preferably thicker or provided with a fillet adjacent the holder providing the most lateral support at the exterior filaments at the holder or cup edge. The elastomeric matrix forms the individual filaments into a substantially integral block and limits their lateral flexibility in effect reinforcing their beam strength or modulus. This in turn permits a higher abrasive loading of the filaments, and higher tool pressures.

The matrix may either be solid or preferably foamed. The matrix is designed to wear at the same rate as the tip of the filaments. The matrix may itself include an abrasive loading. If the tool holder is clinched, the matrix may be injected during clinching with the closing of the mold also clinching the holder, and forming a metal-to-metal seal for the injection process. The clinching of the lip or rim also exaggerates the formation of the holder into a dovetail groove with the injection of the matrix forming a block locking the bundle of filaments into the holder. The matrix may be injected by a reciprocating screw mixing and injection process which not only mixes or plasticizes the elastomer, but also mixes any abrasive or other additives such as blowing agents therewith.

To the accomplishment of the foregoing and related ends the invention, then, composes the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 5 is a schematic view showing injection and clinching with the injection being both at the working face and through the holder with only the former containing abrasive.

FIG. 6 is a fragmentary plan view of the tip face of a honing tool prior to injection;

FIG. 7 is a similar view after injection of a solid or liquid matrix;

FIG. 8 is a similar view after foaming;

FIG. 9 is a side elevation partially broken away of a honing tool in accordance with the present invention;

FIG. 10 is a top plan view of the tool of FIG. 9 illustrating the working face; and FIG. 11 is an end elevation of the tool of FIGS. 9 and 10.

DETAILED DESCRIPTION OF THE PREFERRED EMBODIMENTS

Figure 1:
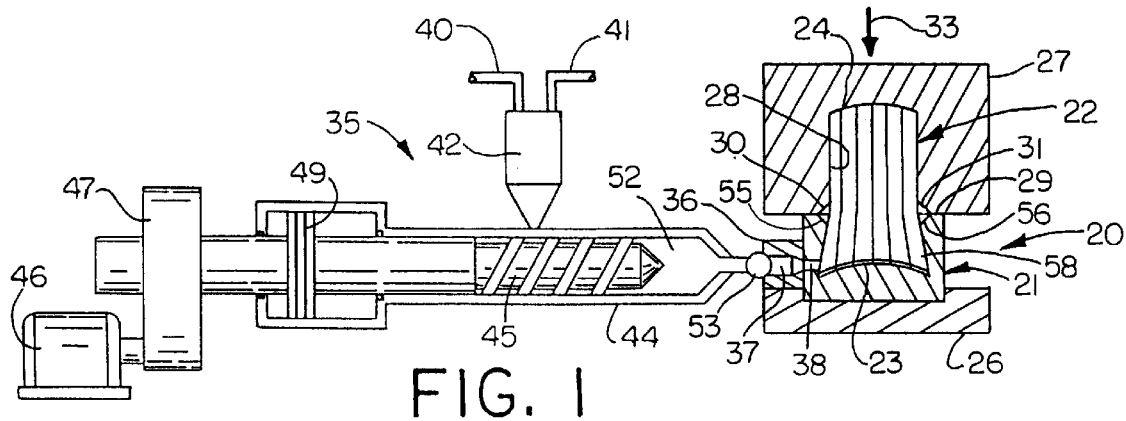
FIG. 1 is a schematic partially in section view and not to scale illustration of one process for making a honing tool of the present invention.

Referring initially to FIG. 1, there is illustrated a method of making a honing tool in accordance with the present invention. The honing tool is shown generally at 20 and includes a metal channel-shape holder 21 with a bundle of tightly packed generally parallel abrasive monofilaments extending a relatively short distance therefrom as indicated at 22. The holder and tool are generally elongated normal to the plane of FIG. 1 and the bundle of tightly packed abrasive monofilaments may be secured to the bottom of the cup holder by a layer of adhesive indicated generally at 23. It is noted that the bottom of the cup holder has a slightly arcuate surface which imparts a slightly arcuate surface to the working face of the tool indicated at 24 with equal length monofilaments. Honing tools of the type described are illustrated in the aforenoted copending application Ser. No. 08/090,770 filed Jul. 13, 1993, entitled "Honing Tool And Method Of Making".

In FIG. 1 the honing tool cup holder supported on a base 26 which may be fixed. A movable mold part 27 includes a recess 28 which telescopes over the bundle 22 and presses against the rim of the holder as indicated at 29. The edges of the recess are provided with pilot surfaces seen at 30 and 31 which facilitate the telescoping of the movable mold part 27 over the projecting bundle. When the mold part 27 is moved in the direction of the arrow 33 and seats on the rim 29, an elastomeric matrix bond is then injected into the tool by the reciprocating screw machine illustrated generally at 35. The fixed mold part 26 includes a runner adapter 36 which includes a runner system 37 communicating with one or more openings 38 in the side wall of the honing tool holder 21.

The components of the elastomeric matrix bond are introduced at 40 and 41 into hopper 42 communicating with barrel 44 in which the screw 45 is telescopically positioned. The screw is rotated by motor 46 through transmission 47 and is moved axially within the barrel by piston 49. The mixture or the melt of the elastomeric matrix bond is formed in the barrel at 52 and at the appropriate point in the cycle, the screw 45 extends to the right in FIG. 1 infecting the elastomeric matrix bond into the bundle of abrasive monofilaments through the shutoff valve 53. The injection may be at significant pressure and infuses the elastomer matrix bond into all of the interstices of the bundle 22. It is preferred that the bond be cellular and incorporate a blowing agent. As so as the high pressure of the mixing or plasticizing screw is relieved, the elastomeric material may commence to foam and this further increases the complete impregnation of all of the interstices of the bundle. When the bond has solidified or cured, the mold is open and the tool is removed.

The process steps described above may be altered somewhat by utilizing the mold closing described above to insert the bundle 22 into the holder 21. In other words, the bundle 22 is initially placed in the mold 27 and the bottom of the cup holder is coated with the adhesive 23. As the mold part 27 closes on the holder, the bundle 22 is then inserted into the holder and the inner ends of the relatively short monofilaments are brought each into contact with the layer of adhesive. To facilitate this concurrent insertion of the bundle with the closing of the mold, the inner edge of the rim 29 of the holder is provided with a pilot or beveled surface as indicated at 55 and 56 matching the surfaces 30 and 31 the mold 27.

Also, it is noted that the interior walls of the recess within the holder 21 are dovetailed slightly as indicated at 58. This permits the inner end of the bundle to expand laterally slightly as it is driven into the holder contacting the layer of adhesive 23. The elastomeric matrix bond is itself a good adherent adhering to the plastic abrasive monofilaments as well as to the interior of the holder 21. The matrix bond then forms with the abrasive monofilaments a solid or cellular block which maintains the monofilaments in the holder throughout the useful life of the tool.

The cooperating surfaces 30–55 and 31–56, when filled with the elastomeric matrix bond, provide a girdling fillet around the bundle at the holder rim which protects the outermost elements in the bundle at the point where they leave the holder.

In any event, the tool shown in FIG. 1 may be formed before the closing of the mold parts for the infusion of the elastomeric matrix bond, or the bundle and holder may be assembled during the closing of the mold.

Figure 2:
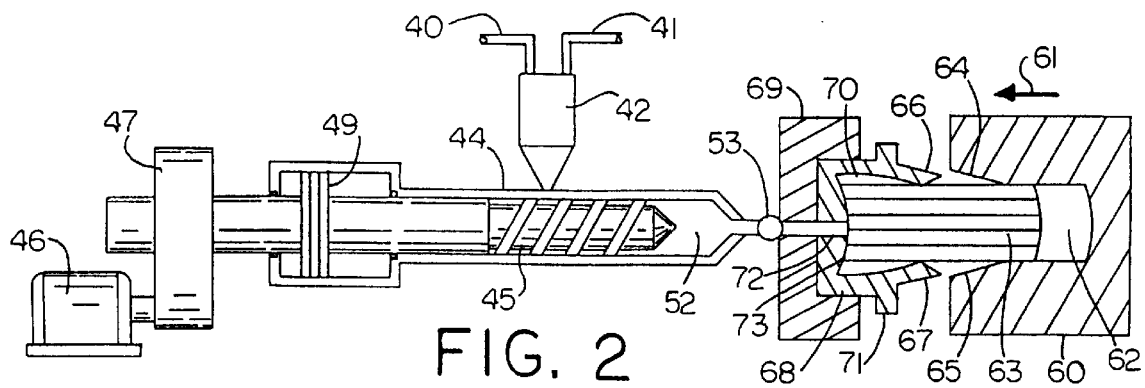
FIG. 2 is a similar view of another process for making another form of honing tool prior to closing and injection.
Figure 3:
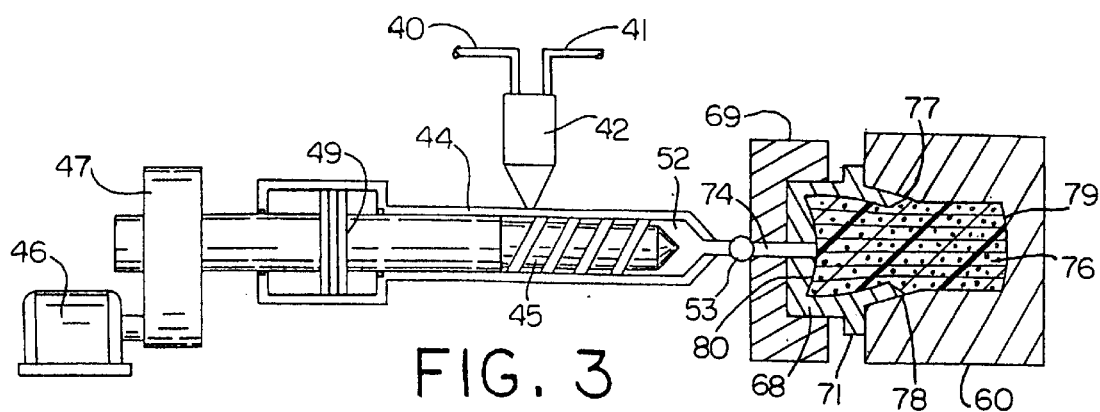
FIG. 3 is a similar view after closing and injection.

Referring now to FIGS. 2 and 3, it will be seen that the mold part 60 movable in the direction of the arrow 61 has a chamber 62 which accommodates the tightly packed bundle of abrasive monofilaments 63. The opening of the chamber is provided with significant and elongated pilot surfaces seen at 64 and 65. These pilot surfaces cooperate with the somewhat attenuated lips 66 and 67 of the metal holder 68 seated in fixed part 69. Again, the side walls of the interior of the holder are in the form of a dovetail channel 70. The holder is provided with a stop flange 71 and one or more bottom ports 72. In the embodiment of FIGS. 2 and 3, no layer of adhesive is employed at the bottom 73 of the cup holder.

As the mold part 60 moves in the direction of the arrow 61 to the position seen in FIG. 3, the surfaces 63 and 64 engage and coin the edges 66 and 67, respectively, driving them toward each other, which edges girdle the bundle 63, constricting about the bundle mechanically to lock the bundle to the holder. The mold part 60 continues to the position seen in FIG. 3 when it seats upon the flange 71. At this time, the lips of the holder have been coined inwardly, not only mechanically to grip the bundle, but also to form a metal-to-metal seal between the holder and the mold part 60. With the mold 61 closed against the holder which is in turn seated in the fixed part 69, the valve 53 is opened and the screw 45 is moved to the right as seen in FIG. 3 injecting the elastomeric matrix bond through runner system 74 in the fixed part and into the bundle of abrasive monofilaments. When the holder combined with the closed mold part has been completely filled with the elastomeric matrix bond and the bond is foamed or cured, the matrix bond and filaments form a solid, all be it cellular block indicated at 76 in FIG. 3. The configuration of the lips 66 and 67 as well as the pilot surfaces 64 and 65 forms the slight enlargement or fillet seen at 77 and 78 in FIG. 3 just outwardly beyond the girdling point of the bundle. The adhesive nature of the elastomeric bond provides a unitized block firmly secured to the holder 68. It is again noted that the working face 79 of the tool is arcuate as is the bottom 80 of the cup holder 68.

Figure 4:
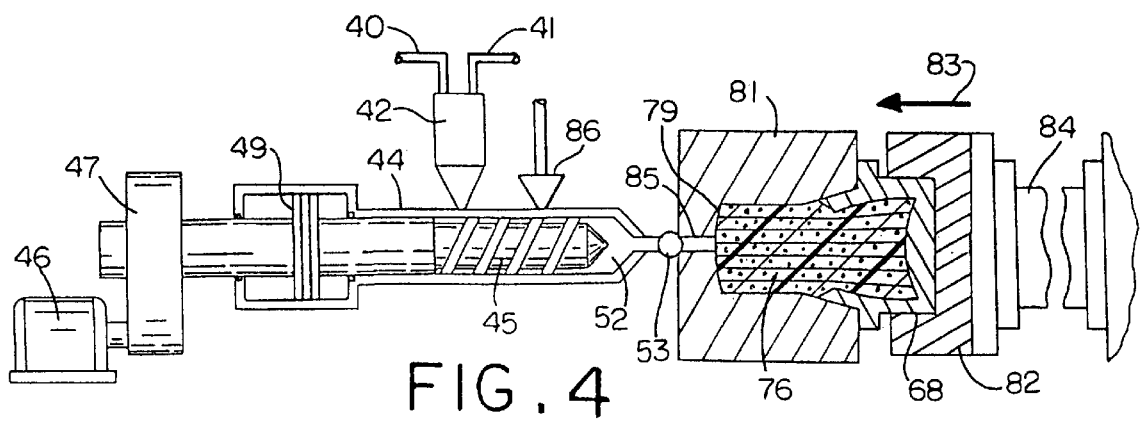
FIG. 4 is a view like FIG. 3 with the matrix injection incorporating abrasive and being through the working face of the tool.

FIG. 4 illustrates a process for making the same tool as shown in FIGS. 2 and 3 where the relative movement between the cup holder 68 and the coining mold part 81 causes the lips of the metal cup holder to swage or move toward each other girdling the bundle of monofilaments. In the embodiment of FIG. 4, the mold part 81 corresponds to mold part 60 of FIGS. 2 and 3, but is fixed. The holder 68 is seated in movable part or platen 82, movable for closing in the direction of the arrow 83 by piston cylinder assembly 84. The other change with respect to FIGS. 2 and 3 is that the mold part 81 is provided with the runner system 85 communicating with the shutoff valve 53. Thus, the elastomeric matrix bond is infused or injected into the bundle of plastic monofilaments through the working face 79. Also, in the embodiment of FIG. 4, abrasive may be added at 86 to the elastomeric matrix bond mix to be thoroughly mixed therewith so that the resin matrix bond cellular block formed as indicated at 76 will include abrasive homogeneously dispersed throughout. It will be appreciated that this abrasive is in addition to the abrasive within the abrasive plastic monofilaments, the tips of which form the working face of the tool.

Referring now to FIG. 5, there is illustrated a further embodiment of the process which forms the honing tool shown generally at 90 which includes the metallic holder 91 and the protecting compact bundle of relatively short abrasive plastic monofilaments 92 which forms the working face 93 of the tool. The tool is enclosed between mold parts 94 and 95 which include respective runner systems 96 and 97. The runner systems are connected through shutoff valves 53 to the oppositely extending injection systems 35. The entire left hand injection system and the mold part 94 may be moved horizontally by the piston 98 within fixed cylinder 99. Similarly, the right hand injection unit 35 may be moved horizontally with the mold part 95 by the piston 100 within fixed cylinder 101. In the method embodiment illustrated, the right hand injection unit 35 may include an abrasive additive as indicated at 102. When the molds are closed, both injection units may be operated concurrently to infuse the tool with the elastomeric matrix bond. The right hand unit 35 which includes the abrasive addition will inject that abrasive only through the working face of the tool. The system of FIG. 5 is particularly useful where the abrasive addition is costly, such as polycrystalline diamond. The abrasive containing elastomeric bond matrix in the finished tool then has an abrasive containing zone, but only in the protecting abrasive filaments and not in the metal cup holder. The particular tool illustrated may be of the type illustrated in FIGS. 2–4 where the closing of the mold parts 94 and 95 coins the lip of the holder 91 girdling the bundle and providing a metal-to-metal seal between the mold parts and the holder.

Referring now to FIGS. 9, 10 and 11, there is illustrated a tool made in accordance with the present invention. The tool includes the metallic holder 21 and the bundle of tightly compacted projecting monofilaments 22 which form the working face 24 of the tool. As can be seen from FIG. 9, the bundle of plastic abrasive monofilaments projects a relatively short distance from the holder 21 and it is the tightly packed tips of the monofilaments which constitute the working face.

The holder is typically elongated as shown and includes at its ends hooks 110 and 111 which facilitate the securing of the tool in the honing head. When the elastomeric matrix bond is injected into the tool, it forms an integument or skin around the sides of the projecting bundle as indicated at 112. It also forms a skin over the working face 24 which, however, is quickly worn away as the tool is used. The integument or skin is enlarged somewhat at the edge of the holder seen at 113 which bead or enlargement is formed during the molding process. This bead or fillet provides additional support for the abrasive filaments the exterior of the bundle at the edge of the rim of the holder. Accordingly, even though the abrasive monofilaments may appear through the integument, a supporting skin is nonetheless provided which is enlarged or thickened at the base of the projecting portion of the monofilaments.

As seen in FIG. 9, the elastomeric matrix bond may be injected through elongated holes indicated at 114 and 115 in the side of the holder. Following the injection process, such holes will be filled with the elastomeric bond and the projecting portion of such bond filling such holes will acts as a mechanical key with the rest of the block formed by such injection to assist in maintaining the bundle and the holder united.

With reference now to FIGS. 6, 7 and 8, there is illustrated an enlarged fragmentary view of the work face of the tool utilizing rectangular abrasive monofilaments shown before, during, and after the infusion of the elastomeric matrix bond. The interstices between or among the compacted filaments is shown slightly exaggerated for illustration purposes. It will be seen that even though the bundle 22 is compacted, there is nonetheless a significant amount of intersticial space 120 between the adjacent filaments 121. In FIG. 7, the elastomeric matrix bond has been infused into such intersticial space as indicated at 122. In FIG. 7, the infusion is in a liquid or viscous melt form. Not only does the liquid fill the intersticial space at 122, it fills the sides of the bundle as seen at 123 and 124 forming the integument 112. In FIG. 8, the infusion has foamed as seen at 126, but the integument or surrounding skin 112 remains.

The Abrasive Monofilaments

The bundle 22 may comprise plastic abrasive loaded filaments or monofilaments having a circular or rectangular transverse cross-section. Typically, a rectangular monofilament at its major flat face may be approximately 0.090 inch wide and about 0.045 inch thick. If circular in section, the diameter may vary. The larger diameters would be on the order as the dimensions set forth above to produce a similar cross-section area. Smaller diameters could be as small as 500 denier, for example.

The monofilament may be extruded plastic impregnated throughout uniformly with an abrasive mineral such as aluminum oxide, fused aluminum oxide, alumina, zirconia or silicon carbide. A wide variety of other abrasives may be included such as cubic boron nitride, sand pumice, garnet, corundum, boron carbide, and fused or sintered alumina. Other more exotic abrasive minerals may readily be employed such as polycrystalline diamond. Also, the abrasive grit size may be varied from coarse to fine powders.

The plastic material preferably has a Young's modulus greater than 0.10 at $10^6$ psi and more preferably greater than 0.40 at $10^6$ psi. Young's modulus is defined as the amount of force a material can undergo without permanent deformation when the force is removed. This is a measure of elasticity or the relationship of stress over strain.

The preferred plastic for extrusion of the monofilament working element is nylon. The preferred nylon is 6/12 nylon. Nylons are long-chain partially crystalline synthetic polymeric amides (polyamides). Polyamides are formed primarily by condensation reactions of diamines and dibasic acids or a material having both the acid and amine functionality.

Nylons have excellent resistance to oils and greases, in solvents and bases. Nylons have superior performance against repeated impact, abrasion, and fatigue. Other physical properties include a low coefficient of friction, high tensile strength, and toughness. Useful mechanical properties of nylon include strength, stiffness and toughness. In general, the greater the amount of amide linkages, the greater the stiffness, the higher the tensile strength, and the higher the melting point. Several useful forms of nylon are available and include:

A. Nylon 6/6 synthesized from hexamethylenediamine (HMD) and adipic acid;

B. Nylon 6/9 synthesized from HMD and azelaic acid;

C. Nylon 6/10 synthesized from HMD and sebacic acid;

D. Nylon 6/12 synthesized from HMD and dodecanedioic acid;

E. Nylon 6 synthesized from polycaprolactam;

F. Nylon 11 synthesized from 11-aminoundecanoic acid;

G. Nylon 12 synthesized from polyaurolactam; and others.

Nylons useful in the present invention have a Young's modulus greater than 0.05, preferably greater than 0.01 and preferably greater than 0.02.

The preferred nylon is nylon 6/12. The physical properties of nylon 6/12 include a melting point of 212° C., a dry yield strength at $10_3$ psi of 8.8 (7.4 at 50% RH), a dry flexural modulus of 295 (180 at 50% RH). Nylon has a higher Young's modulus (0.40 at $10^6$ psi) than rubber (0.01 at $10^6$ psi), which demonstrates the greater stiffness of nylon over an elastomer such as rubber, for example. As an example, a working element according to the present invention several feet long when held horizontally at one end at room temperature would show little or minimal deflection at the opposite end.

Nylon is partially crystalline, hence has little or no rubbery regions during deformation. The degree of crystallinity determines the stiffness and yield point. As the crystallinity decreases, the stiffness and yield stress decreases. Rubber, on the other hand, is an amorphous polymer and its molecular straightening leads to a low modulus of elasticity.

Nylon has a tensile strength of over 8000 psi, rubber has a tensile strength of 300 psi. Nylon exhibits 250% breakage during elongation, rubber exhibits 1200%. Nylon has fair moisture resistance, yet rubber absorbs a large amount of water. Nylon has excellent resistance to oil and greases and other organic solvents, rubber has extremely poor resistance. Nylon retains its properties from −75° F. to 230° F., while rubber has a narrow range around room temperature. Nylon's increased strength, resistance to moisture and solvents, and its wide usable temperature range make it the preferred material for this construction.

Another type of polyamide useful in the present invention include other condensation products with recurring amide groups along the polymer chain, such as aramids. Aramids are defined as a manufactured fiber in which at least 85% of the amide (—C(O)—N(H)—) linkages are attached directly to two aromatic hydrocarbon rings. This is distinguished from nylon which has less than 85% of the amide linkages attached directly to the two aromatic rings.

The plastic material may also be aramid fibers which are characterized by high tensile strength and high modulus. Two aramids that may be useful in the present invention include fiber formed from the polymerization of p-phenylenediamine with terephthaloyl chloride and a less stiff polymer formed from the polymerization of m-phenylenediamine and isophthaloyl chloride.

Aramids demonstrate a very strong resistance to solvents. Aramids have tensile strengths at 250° C. that are exhibited by textile fibers at room temperature. Also, some thermoset polymers are useful. Polyesters are an example and are long chain synthetic polymers with at least 85% of a dihydric alcohol ester (HOROH) and terephthalic acid (p-HOOCC$_6$H$_4$COOH). Polyesters fibers contain both crystalline and non-crystalline regions. Polyesters are resistant to solvents and demonstrate a breaking elongation of 19 to 40%.

Polyimides are polymers containing (CONHCO) are also useful in the present invention. High temperature stability (up to 700° F.) and high tensile strength of 13,500 psi make polyimides useful as binders in abrasive wheels.

The amount or percentage of abrasive is larger than would ordinarily be the case without the supporting cellular elastomeric matrix bond. Without the bond, an upper limit of from about 30 to about 40 percent provides for optimum tool wear and work efficiency. Higher amounts tend to shorten tool life, and shorter tool life has many economic disadvantages which offset any short term increase in efficiency. With the present invention, the abrasive loading can be increased significantly and achieve longer tool life. It is preferred that the loading be in excess of 30 percent and loading as high as 55 percent is achievable. Above such figures, the monofilament is costly to extrude and the tool and monofilament is difficult to form and handle.

Cellular Elastomer Matrix Bond

The preferred cellular elastomer is a somewhat flexible medium to low density polyurethane. The elastomer should bond to the plastic of the abrasive monofilaments and the high abrasive loading of such monofilaments facilitates that bond. A coupling agent may be incorporated in the mixture to ensure such bond, although polyurethanes are noted for their adhesive characteristics. The cellular reinforcing matrix bonds not only to the filaments but to the metal of the hub. The interior mold surfaces are, however, treated or sprayed to release the tool when cured.

The density of the cellular matrix bond is from about 4 to about 30 lbs/cu/ft, and preferably from about 10 to about 20 lbs/cu/ft. Such density is properly characterized as a light to medium density. Urethane foams can vary from about 1.2 to about 60 lbs/cu/ft. When the cellular structure wears away, it will disintegrate quickly into mostly gas and will not pass into a liquid state at normal working pressures.

The preferred polyurethanes are available as a two component liquid system which enter the process system at 40 and 41 and are coblended or mixed by the rotating screw 45. The two components are usually a toluene diisocyanate and a hydrogen donor, usually high molecular weight polyethers. Typically, one component is about 0.9 to in excess of 1.5 equivalents of selected diisocyanate with one equivalent of a dihydroxy terminated polyester or polyether whose molecular weight is above about 500 to 4000. It is common to use stoichiometric excesses of the diisocyanate component to provide required curing. In this invention, it is preferred to react 1.05 equivalents of selected diisocyanate with one equivalent of a dihydroxy terminated polyester or polyether. Plasticizers, including octyl alcohol terminated polypropylene adipates of 2000 to 5000 molecular weight from 2 to 20% may be used to soften the polyurethane and to control flexibility.

The density of the foam is controlled with the use of water as the blowing agent, although water may be used in combination with other blowing agents. However, ozone damaging chlorinated hydrocarbons are to be avoided.

In addition to the coupling agents mentioned, other additives may be the usual surfactants providing a uniformity of small cell size, and catalysts. Extenders or other erodable fillers are generally to be avoided, although a fine or medium grit abrasive may be incorporated into the foam. The abrasive may be added at 102 in FIG. 5, or 84 in FIG. 4.

Some thermoplastic elastomers are useful. With the use of thermoplastic elastomers, the components are added as solids to the hopper 42 and the screw 45 becomes a plasticizing screw forming a low viscosity melt under high pressure. The barrel 44 may be heated to help form the melt. A wide variety of blowing agents are useful. Examples are compressed air, nitrogen, carbon dioxide, or methylene chloride. It is desirable to avoid blowing agents with open flash points or chlorinated hydrocarbons.

Thermoplastic elastomers are polymeric materials having some characteristics of thermoplastics and some characteristics of elastomer. Accordingly, thermoplastic elastomers may be melted, subjected to processing and cooled and reformed like thermoplastics while having the elasticity properties of elastomers. The polymers consist of hard regions or domains and soft regions or domains. The hard regions generally comprises low equivalent weight polyfunctional monomers whereas the soft region is generally comprised of high equivalent weight polyfunctional monomers. The melting temperature of the soft regions is generally less than the melting temperature of the hard region. In addition, chain extenders such as ethylene, diamine or 1,4-butanediol may be used to increase the hard segments and therefore hard domain size. The high equivalent weight soft regions form flexible chains connecting the low equivalent weight hard regions.

The flexible characteristics of the foam elastomer will depend the amount and composition of the hard regions and soft regions present in the thermoplastic elastomer. Specific examples of useful thermoplastic elastomers along with the particular monomers used to prepare the soft and hard regions are:

(1) Polyester thermoplastic elastomers.
   Soft: poly(tetramethyleneoxide)
   Hard: poly(tetramethyleneterephthalate)
(2) Polyether block amide (PEBA) thermoplastic elastomers
   Hard: polyamide blocks
   Soft: polyether blocks
(3) Polyurethane thermoplastic elastomers
   Hard: 4,4'-diphenylmethanediisocyanate (MDI) with a chain extender 1,4-butanediol
   Soft: polyether or polyester chains, specifically hydroxy terminated polyether or polyester chains.

Accordingly, the preferred cellular elastomers are polyurethanes which are nonthermoplastic, thermoplastic polyurethanes, polyethers, and polyesters. Again, coupling agents, surfactants and other additives may be included to provide the density and elastomer qualities to the foam to provide the advantages noted above.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A method of making a honing tool comprising the steps of forming a compact bundle of relatively short abrasive containing monofilaments, inserting the bundle into a holder so that a portion of the monofilaments projects a uniform short distance from the holder with the tips of the monofilaments forming the working face of the tool, and encapsulating said bundle in an elastomer to provide improved support for said portion of said monofilaments.

2. A method as set forth in claim 1 including the step of placing the tool in a mold to infuse the elastomer into the bundle.

3. A method as set forth in claim 2 including the step of foaming the elastomer.

4. A method as set forth in claim 3 including the step of including an abrasive an said elastomer.

5. A method as set forth in claim 2 including the step of injecting the elastomer under pressure into the mold after the mold is closed.

6. A method as set forth in claim 5 including the step of coining the holder to girdle the bundle as the mold is closed.

7. A method as set forth in claim 5 including the step of injecting through the bottom of the holder.

8. A method as set forth in claim 5 including the step of injecting through the side of the holder.

9. A method as set forth in claim 5 including the step of injecting through the working face of the bundle.

10. A method as set forth in claim 1 wherein said elastomer is adhesive and facilitates securing said monofilaments to each other and said bundle to said holder.

11. A method as set forth in claim 10 including forming the holder as a dovetail slot, and filling said slot with said elastomer to facilitate securing said bundle to said holder.

12. A method as set forth in claim 10 including lateral openings in said holder, said elastomer filling said openings and keying said bundle to said holder.

13. A method as set forth in claim 1 wherein said elastomer fills the interstices of said bundle and provides an integument around said bundle.

14. A method as set forth in claim 13 wherein said integument includes a fillet girdling the bundle at the edge of the holder.

15. A method as set forth in claim 1 including the step of curing the elastomer after injection.

16. A method as set forth in claim 1 including the step of securing said bundle to said holder with a thin layer of adhesive prior to encapsulating said bundle.

* * * * *